United States Patent
Allen et al.

(10) Patent No.: US 6,668,424 B1
(45) Date of Patent: Dec. 30, 2003

(54) SNAP-IN ASSIST GRIP AND ASSEMBLY METHOD

(75) Inventors: Robert E. Allen, Flint, MI (US); Samuel M. Reddypogu, Farmington Hills, MI (US); David W. Curtis, South Lyon, MI (US); Thomas A. Miller, Royal Oak, MI (US); Jeffrey Braybrook, Brighton, MI (US); John L. Dugan, Monroe, MI (US); Anthony A. Prasatek, Rochester, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/207,675

(22) Filed: Jul. 29, 2002

(51) Int. Cl.[7] .................................................. B62B 7/00
(52) U.S. Cl. ...................... 16/444; 16/436; 16/DIG. 41; 16/DIG. 40; 296/214
(58) Field of Search .......................... 16/443, 444, 436, 16/410, DIG. 41; 296/214; 411/508, 509, 510, 513, 182

(56) References Cited

U.S. PATENT DOCUMENTS

| | | | |
|---|---|---|---|
| 4,404,709 A | | 9/1983 | Janz et al. |
| 4,912,808 A | | 4/1990 | Blakely |
| 5,259,089 A | | 11/1993 | Baur et al. |
| 5,519,917 A | | 5/1996 | Cordonnier |
| 5,560,669 A | * | 10/1996 | Gute ........................ 296/97.9 |
| 5,632,061 A | | 5/1997 | Smith et al. |
| 5,662,375 A | | 9/1997 | Adams et al. |
| 5,920,957 A | * | 7/1999 | Wagner ........................ 16/408 |
| 5,975,606 A | * | 11/1999 | Forbes et al. ................. 296/1.1 |
| 5,991,976 A | | 11/1999 | Adams et al. |
| 6,106,055 A | * | 8/2000 | Fischer ........................ 296/214 |
| 6,176,660 B1 | * | 1/2001 | Lewis et al. .................. 411/45 |
| 6,415,478 B1 | * | 7/2002 | Watanabe et al. ............. 16/444 |
| 6,517,039 B1 | * | 2/2003 | Arisaka .................. 248/231.81 |
| 6,517,302 B2 | * | 2/2003 | Lee ............................. 411/182 |

FOREIGN PATENT DOCUMENTS

| | | | |
|---|---|---|---|
| DE | 3607744 A1 | | 9/1987 |
| JP | 9-156409 | * | 6/1997 |
| JP | 2001-39195 A | * | 2/2001 |
| JP | 2002-227815 A | * | 8/2002 |

* cited by examiner

Primary Examiner—Chuck Y. Mah
(74) Attorney, Agent, or Firm—Bill C. Panagos

(57) ABSTRACT

A handle assembly and method of assembling a grip handle to a vehicle. The handle assembly includes two base unit and each include a primary and auxiliary projection that are press fit into an opening formed in a structural part of a vehicle. Detents are provided on the projection and configured to be assembled to a vehicle with a minimum force and require a removal force that is substantially greater then the force of insertion. A method of assembling the assist grip handle to a vehicle can be accomplished by inserting molded projections into holes formed in a structural vehicle body panel. The projections include detents that are compressed as the projections are inserted into the holes and are expanded after the projections are fully inserted into the holes.

12 Claims, 3 Drawing Sheets

SNAP-IN ASSIST GRIP AND ASSEMBLY METHOD

BACKGROUND OF THE INVENTION

1. Field of the Invention

The present invention relates to an assist handle for a vehicle and a method of assembling the assist grip handle to a vehicle by a snap-in process.

2. Background Art

Assist grip handles are provided in cars, trucks, and sport utility vehicles to assist occupants as they enter and exit a vehicle. Assist grip handles may be static or dynamic. Dynamic handles are movable between an extended position and a retracted position. A wide variety of assist grip handle designs are available. Currently available assist grip handles may be attached to the roof through the head liner or may be attached to one of the roof support pillars that are known as the A, B, or C pillars either directly or through a trim piece. The A pillar is the roof support pillar located between the windshield and the first row seat window. The B pillar is the roof support pillar between the front and rear doors or in a coupe as the pillar located behind the doors of the vehicle. The C pillar is the roof support pillar located between the rear door and the back light of the vehicle. Assist grip handles are generally located near door openings so that they may be easily grasped by a passenger as they enter or exit the vehicle.

Prior art assist grip handles as disclosed in U.S. Pat. No. 5,259,089 and Offenlegungsschrift DE 3,607,744 A1 are normally secured by conventional fasteners, to a hole formed in a sheet metal part. Assist grip handles have two ends and require at least two fasteners that locate and secure the two ends of the assist grip handle to the mounting surface. This requires a substantial amount of time in the final assembly process and adds to the cost of assembly. Assist grip handles must be able to withstand more than 1,400 Newtons of force applied to the handle without becoming dislodged from the mounting surface. Previously, the only way known to the inventors to provide an assist grip handle robust enough to withstand such pressure was to secure the assist grip handle with permanent fasteners that must be assembled to the vehicle in the final assembly process. The maximum insertion force for assembling such handles to a vehicle may not exceed 68.6 Newtons of force per palm.

Other approaches suggested by the prior art include complex clip arrangements, such as the apparatus disclosed in U.S. Pat. Nos. 5,662,375; 4,912,808; and 4,404,709. These devices are multi-part assemblies that would be difficult to consistently manufacture and assemble in such a way that they would meet the proposed insertion and extraction force requirements for assist grip handles.

The present invention is directed to overcoming the above problem, as will be summarized below.

SUMMARY OF THE INVENTION

According to one aspect of the present invention, a handle assembly for assisting passengers in entering and exiting a vehicle is provided that comprises a handle grip having two ends with each end having a retainer. Two base units with one base unit being provided for each end of the handle grip are provided that have at least one snap element that is adapted to be press fit into an opening formed in a structural part of the vehicle. These snap elements are configured to be retained in the opening against a removal force that is substantially greater than the force required to press fit the snap element in the opening. The base element defines a receptacle for a fastener that secures the retainer of the handle to the base unit.

According to another aspect of the invention, a method of assembling an assist grip handle to a vehicle is provided that comprises forming at least two holes in a structural body panel. An assist grip handle is provided that has a pair of opposite ends. A pair of base units are provided on each of the opposite ends of the assist grip handle each of which includes two projections having detents. The assist grip handle is assembled to the base units off of the assembly line while the step of assembling the base units to the vehicle is accomplished by asserting each of the projections into one of the holes in the body panel. The detents are compressed as the projections are inserted into the holes and then expanded after the projections are sufficiently inserted into the holes. The assist grip handle is retained by the detents against forces applied to the assist grip handle after installation.

According to another aspect of the invention, the base unit may have two molded snap elements including a primary snap element and an auxiliary snap element that is smaller than the primary snap element. Each snap element is a protrusion having a longitudinal axis having at least one detent that is movable toward and away from the longitudinal access. The detent moves toward the access when the snap element is inserted in the opening in the structural part of the vehicle and moves away from the access after it is inserted. The detent may also be referred to as a tang having an entrant cam surface that comprises the detent as the projection is initially inserted in the hole and reentrant cam surface that is received in the hole and resists removal of the projection. A pair of covers are also provided to enclose the retainers of one of the fasteners and also partially encloses one of the base units.

Other aspects of the method of the invention include forming two large diameter holes and two small diameter holes in the vehicle for receiving two primary projections and two auxiliary projections formed on the molded base units. The detents provided on the base units comprise molded cantilevered tangs on oppositely oriented sides of the projections that have entrant cam surfaces that compress the detent as the projection is initially inserted in the hole and a reentrant cam surfaces over which the hole passes that resist removal of the projections. The projections may be injection molded as part of the base units in one piece. According to the method, the assist grip handle end may be assembled to the base units by a fastener before the base units are assembled to the vehicle.

These and other aspects of the invention will be understood by one of ordinary skill in the art in view of the attached drawings and following detailed description of the preferred embodiments.

DETAILED DESCRIPTION OF THE PREFERRED EMBODIMENT(S)

Figure 1:
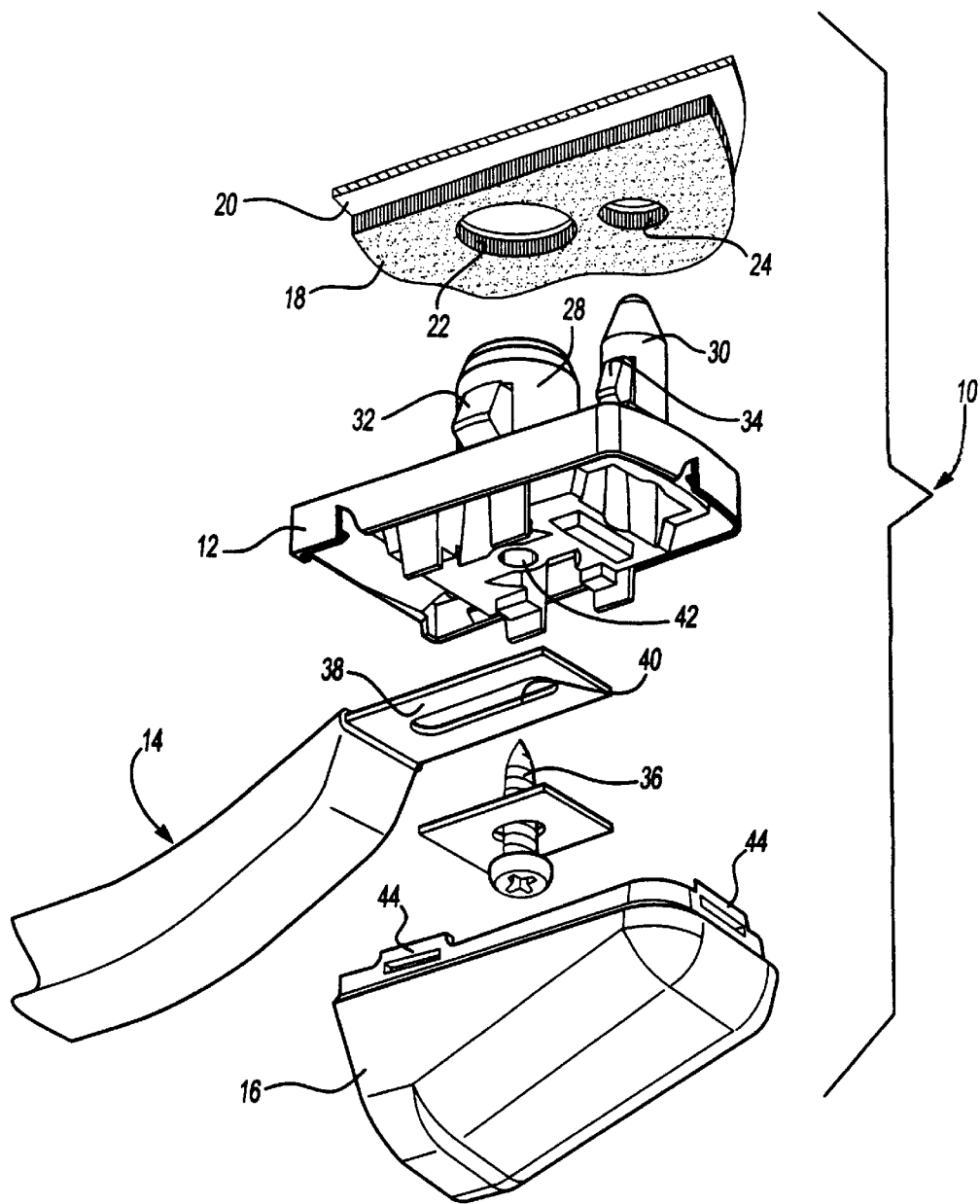
FIG. 1 is an exploded perspective view of one end of an assist grip handle assembly made in accordance with the present invention.

Referring now to FIG. 1, one end of an assist grip handle assembly 10 is shown in an exploded perspective view. The assist grip handle assembly 10 includes a base unit 12 and a handle 14 that is attached to the base unit 12. A cover 16 covers one end of the handle 14 on the base unit 12. Assist grip handle assembly 10 is assembled to a vehicle (not shown) through a trim piece such as a head liner 18 and onto a structural part of the vehicle such as an inner roof panel 20 that is made of sheet metal or other rigid structural material. A primary hole 22 and an auxiliary hole 24 are formed through the head liner 18 and the roof panel 20. Primary and auxiliary projections 28 and 26 are received in the primary and auxiliary holes 22 and 24, respectively. The primary projection 28 includes a pair of opposed primary detents 32. The auxiliary projection 30 includes a pair of auxiliary detents 34. The detents 32, 34 are compressed as the projections 28, 30 are inserted in the holes 22, 24. The detents 32, 34 move away from each other to lock the base unit 12 to the inner roof panel 20 after the projections 28, 30 are inserted fully into the holes 22, 24 in the roof panel 20.

A fastener 36 is used to secure a retainer tang 38 of the handle 14 to the base unit 12. The fastener 36 is received in a slot 40 formed in the retainer tang 38. A hole 42 is provided in the base unit 12 for receiving the fastener 36. The hole 42 is coaxial with the primary projection 28.

Figure 2:
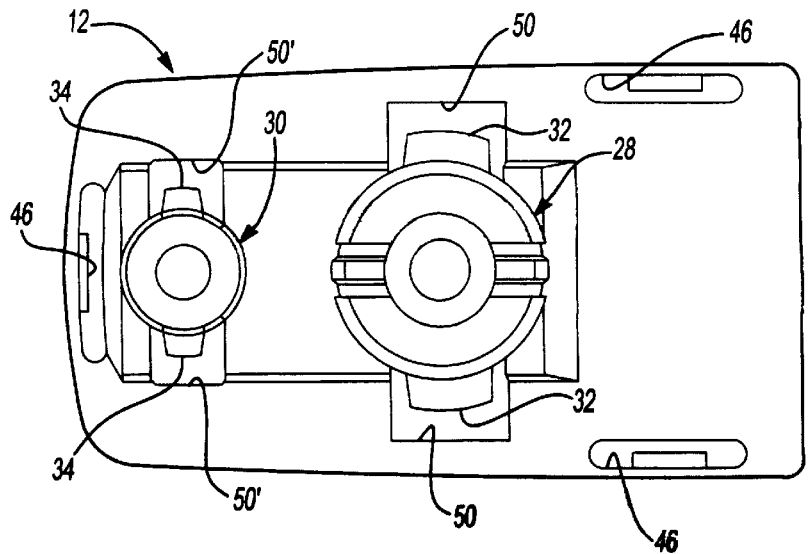
FIG. 2 is a top plan view of a base unit of an assist grip handle assembly.

Referring now to FIGS. 1 and 2, the base unit 12 is shown from the point of view of the surface to which the base unit is to be attached. The surface may be a roof pillar or inner roof surface. The assist grip handle assembly may also be used in other locations such as on a tailgate or in other locations in a vehicle interior.

Figure 3:
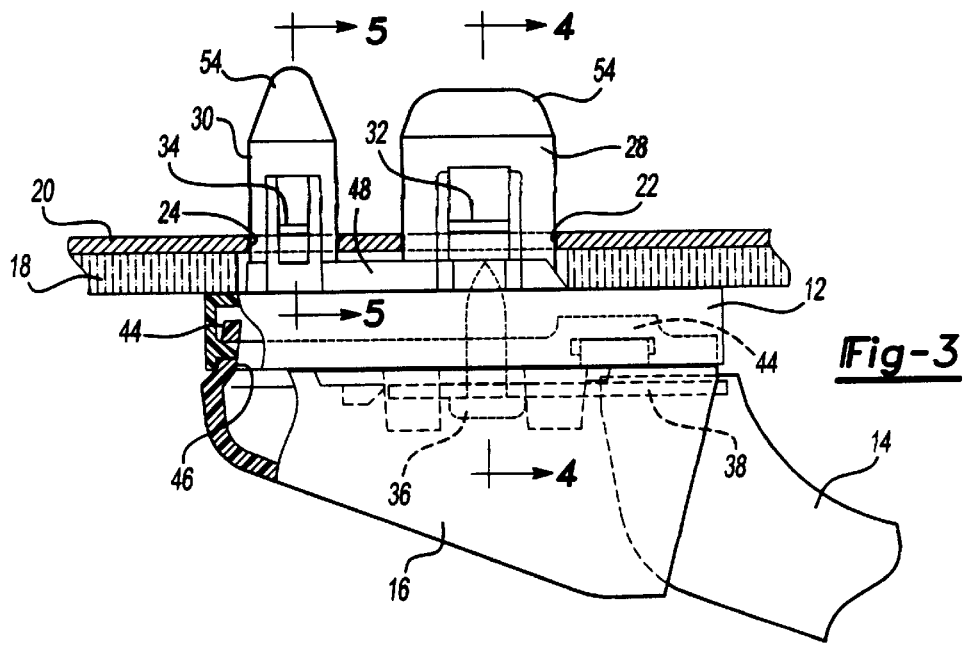
FIG. 3 is a fragmentary partially cutaway view of one end of an assist grip handle assembly.

Referring now to FIGS. 1, 2 and 3, cover tabs 44 engage tab receptacle slots 46 in the base unit 12. The cover tabs 44 are formed as part of the cover 16 and are used to detachably secure the cover 16 to the base unit 12. A platform 48 supports the primary and auxiliary projections 28 and 30. Slots 50 are formed adjacent the primary and auxiliary projections 28 and 30 and the primary and auxiliary detents 32 and 40. The slots 50 provide access to the detents 32, 34 if it becomes necessary to remove the assist grip handle assembly 10 from the inner roof panel 20.

Figures 4, 5:
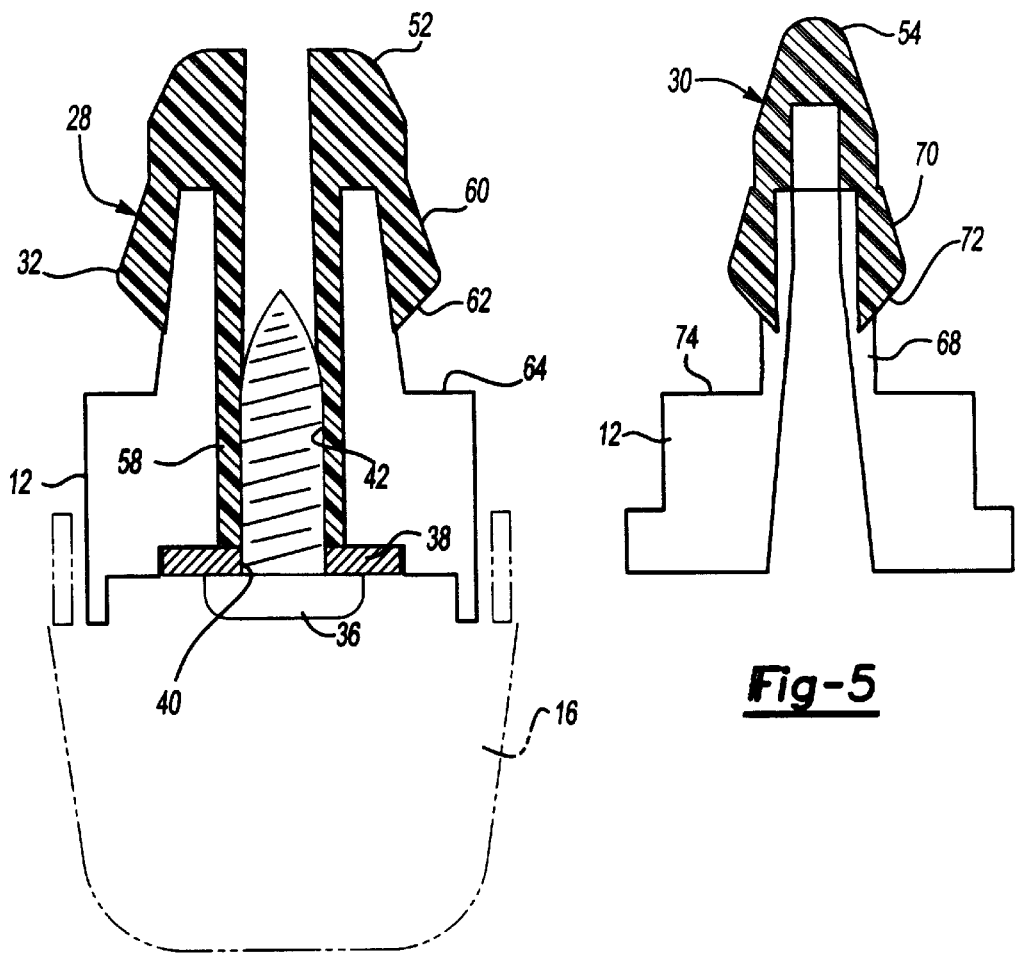
FIG. 4 is a cross sectional view taken the line 4—4 in FIG. 3.
FIG. 5 is a cross sectional view taken along the line 5—5 in FIG. 3.

Referring now to FIGS. 3 through 5, the primary and auxiliary projections 28 and 30 will be described in greater detail. The primary projection 28 is slightly shorter in length but greater in diameter than the auxiliary projection 30. The distal end of the primary projection 28 includes a shoulder 52 that guides and facilitates insertion of the primary projection 28 in the primary hole 22. The primary projection includes a central support 58. The hole 42 that receives the fastener 36 is formed in the central support 58. The central support 58 is connected on one end to the shoulder 52. The detents 32 extend back toward the platform 48 from the shoulder 52. The detents 32 include an entrant ramp surface 60 that functions as a cam surface as the projection 28 is inserted at the primary hole 22. The primary detents 32 are compressed as the projection is inserted in the primary hole 22. When the end of the entrant ramp surface 60 is reached, the primary detents 32 expand as the reentrant ramp surface 62 passes through the primary hole 22 in the inner roof panel 20. A flush surface 64 is provided on the base unit 12. The flush surface 64 is secured flush to the head liner 18 when the assist grip panel assembly 10 is fully assembled to the head liner 18 and inner roof panel 20. The fastener 36 received in the slot 40 of the retainer tang 38 is also engages the hole 42. The cover 16, shown in phantom lines in FIG. 4, encloses the retainer tang 38 and the fastener 36 in conjunction with the base unit 12.

With continued reference to FIGS. 3 and 5, the auxiliary projection 30 will be described in greater detail. The auxiliary projection 30 also includes a central support 68 that extends from the base unit 12 to the rounded point 54. The detents 34 extend toward the platform 48 from the rounded point 54. Entrant ramp surfaces 70 or the detents 34 function in a manner similar to the entrant ramp surfaces 60 of the primary projection 28. As the auxiliary projection 30 is inserted in the auxiliary hole 24, the auxiliary detents 34 are compressed toward each other until the inner roof panel 20 passes the widest point of the auxiliary projection 30. As the auxiliary projection 30 passes further into the auxiliary hole 24, the roof panel 20 engages the reentrant ramp surface 72 until a flush surface 74 of the base unit 12 contacts the head liner 18.

The reentrant ramp surfaces 62 and 72 lock the base unit 12 into the primary and auxiliary holes 22 and 24. The insertion force required to insert the assist grip handle 10 may be limited to a maximum of 7 Kgf per palm by controlling the size and angular orientation of the entrant ramp surface 60. Removal of assist grip handle assembly is required to resist an extraction force in excessive of 1,400 Newtons. This is achieved by maintaining the reentrant ramp surface 62 at a relatively steep angle relative to the holes 22 and 24 in the roof panel 20.

The base unit 12 may be a one piece injection molded body including the primary and auxiliary projections 28 and 30, the detents 32 and 34, the shoulder portion 52 and rounded point 54. Alternatively, the base unit could be formed in two or more parts.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A handle assembly for assisting passengers in ingress and egress of a vehicle comprising:
   a handle grip having two ends with each end having a retainer;
   a fastener engaging each of the retainers; and
   two base units with one base unit being provided for each end of the handle grip, each base unit having at least two snap elements that are adapted to be press fit into two openings formed in a structural part of the vehicle, the snap elements being configured to be retained in the openings against a removal force that is greater than the force required to press fit the snap elements into the openings, each of the base elements having a hole for the fastener that secures one of the retainers of the handle to one of the base units.

2. The handle assembly of claim 1 wherein the two snap elements comprise a primary snap element and an auxiliary snap element and wherein the auxiliary snap element is smaller than the primary snap element.

3. The handle assembly of claim 2 wherein the hole for the fastener is coaxially located in the primary snap element.

4. The handle assembly of claim 1 wherein each snap element is a projection having a longitudinal axis, and wherein at least one detent is provided that is movable toward and away from the axis, the detent moving toward the axis when the snap element is inserted in the opening in the structural part of the vehicle and away from the axis after it is inserted.

5. The handle assembly of claim 4 wherein the detent is a tang having an entrant cam surface that compresses the detent as the projection is initially inserted in the hole and a reentrant cam surface that is received in the hole and resists removal of the projection.

6. The handle assembly of claim 5 wherein the detents extend from near the distal end of the projection toward a central support portion of the base element.

7. The handle assembly of claim 1 further comprising a pair of covers, each of which encloses one of the retainers, one of the fasteners, and partially encloses one of the base units.

8. A method of assembling an assist grip handle to a vehicle, comprising:

forming at least four holes in a structural body panel;

providing an assist grip handle having a pair of opposite ends;

providing a pair of base units on each of the opposite ends, the base units each including at least two projections having detents;

assembling the assist grip handle to the base units;

assembling the base units to the vehicle by inserting each of the projections into one of the holes in the body panel;

compressing the detents as the projections are inserted into the holes; and expanding each of the detents after the projections are sufficiently inserted into the holes, wherein the assist grip handle is retained by the detents against forces applied to the assist grip handle after installation.

9. The method of claim 8 wherein the step of forming the at least two holes includes forming two large diameter holes and two small diameter holes that are smaller than the large diameter holes and wherein the step of providing an assist grip handle having at least two projections includes molding two primary projections and two auxiliary projections that have a reduced cross section relative to the primary projections on the molded base units.

10. The method of claim 8 wherein the detents are a pair of cantilevered tangs on oppositely oriented sides of each of the projections, each of the detents having an entrant cam surface that compresses the detent as the projection is initially inserted in the hole and a reentrant cam surface over which the hole passes that resists removal of the projections.

11. The method of claim 8 further comprising injection molding two projections with the base units in one piece and wherein the detents have an entrant cam surface that compresses the detent as the projection is initially inserted in the hole and a reentrant cam surface over which the hole passes that resists removal of the projections.

12. The method of claim 8 wherein the assist grip handle ends are assembled to the base units by a fastener before the base units are assembled to the vehicle.

* * * * *